US012577898B2

(12) United States Patent
Hattori

(10) Patent No.: US 12,577,898 B2
(45) Date of Patent: Mar. 17, 2026

(54) HONEYCOMB STRUCTURE, ELECTRICALLY HEATED CARRIER, AND EXHAUST GAS PURIFICATION DEVICE

(71) Applicant: NGK Insulators, Ltd., Nagoya (JP)

(72) Inventor: Mako Hattori, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 238 days.

(21) Appl. No.: 18/162,748

(22) Filed: Feb. 1, 2023

(65) Prior Publication Data

US 2023/0313721 A1 Oct. 5, 2023

(30) Foreign Application Priority Data

Mar. 30, 2022 (JP) ................................. 2022-057283

(51) Int. Cl.
*F01N 3/20* (2006.01)
*B01D 53/32* (2006.01)
(Continued)

(52) U.S. Cl.
CPC ........... *F01N 3/2026* (2013.01); *B01D 53/32* (2013.01); *B01D 53/945* (2013.01); *B01J 27/224* (2013.01); *F01N 3/2828* (2013.01)

(58) Field of Classification Search
CPC ..... F01N 3/2026; F01N 3/2828; B01D 53/32; B01D 53/945; B01J 27/224; B01J 35/56
See application file for complete search history.

(56) References Cited

U.S. PATENT DOCUMENTS 9,789,467 B2 10/2017 Mori et al.
2014/0290195 A1 10/2014 Izumi et al.
(Continued)

FOREIGN PATENT DOCUMENTS

EP 2 644 582 A1 10/2013
JP 2014-189447 A 10/2014
(Continued)

OTHER PUBLICATIONS

Chinese Office Action (Application No. 202310202877.8) dated Nov. 25, 2025 (with English translation) (16 pages).

*Primary Examiner* — Anthony J Zimmer
*Assistant Examiner* — Abdul-Rahman Yusuf Waleed Smari
(74) *Attorney, Agent, or Firm* — BURR PATENT LAW, PLLC

(57) ABSTRACT

A honeycomb structure including an electrically conductive honeycomb structure portion, comprising an outer peripheral wall, and partition walls disposed inside the outer peripheral wall and partitioning a plurality of cells forming flow paths from one end surface to the other end surface; and a pair of electrode layers provided on an outer surface of the outer peripheral wall so as to face each other across a central axis of the honeycomb structure portion; wherein a coefficient of linear expansion of the honeycomb structure portion measured according to JIS R1618:2002 when temperature is changed from 40° C. to 300° C. is $4.1 \times 10^{-6}/°$ C. or more, and the coefficient of linear expansion of the honeycomb structure portion measured according to JIS R1618:2002 when the temperature is changed from 300° C. to 800° C. is $4.2 \times 10^{-6}/°$ C. or more and $4.8 \times 10^{-6}/°$ C. or less.

7 Claims, 3 Drawing Sheets

(51) Int. Cl.
B01D 53/94 (2006.01)
B01J 27/224 (2006.01)
F01N 3/28 (2006.01)

(56)  References Cited

U.S. PATENT DOCUMENTS

2018/0112577 A1 * 4/2018 Izumi .................. C04B 38/0006
2019/0314802 A1 * 10/2019 Kimata ................. F01N 3/2026

FOREIGN PATENT DOCUMENTS

JP      2018-197182 A    12/2018
JP      2019-181457 A    10/2019

* cited by examiner

HONEYCOMB STRUCTURE, ELECTRICALLY HEATED CARRIER, AND EXHAUST GAS PURIFICATION DEVICE

CROSS REFERENCE TO RELATED APPLICATIONS

The present invention claims the benefit of priority to Japanese Patent Application No. 2022-057283 filed on Mar. 30, 2022 with the Japanese Patent Office, the entire contents of which are incorporated herein by reference in its entirety.

FIELD OF THE INVENTION

The present invention relates to a honeycomb structure, an electrically heated carrier provided with the honeycomb structure, and an exhaust gas purification device provided with the electrically heated carrier.

BACKGROUND OF THE INVENTION

In recent years, electrically heated catalyst (EHC) has been proposed in order to improve the deterioration of exhaust gas purification performance immediately after engine starts-up. An EHC is a system that raises the temperature of the catalyst carried on a honeycomb structure to an activation temperature before starting up an engine by arranging a pair of electrodes on a honeycomb structure made of conductive ceramics and energizing the honeycomb structure itself to generate heat. In an EHC, a honeycomb structure is usually housed (canned) in a metal can body (hereinafter referred to as a "metal pipe") and installed on the way of an exhaust gas flow path of an automobile.

A honeycomb structure is required to have thermal shock resistance because high-temperature exhaust gas flows through it. In order to improve the thermal shock resistance, studies have been conducted on the suitable coefficient of thermal expansion of ceramics which are constituent materials of honeycomb structures. Patent Literature 1 discloses that a coefficient of linear expansion at 25 to 800° C. is preferably 3.5 to 6.0 ppm/K, more preferably 3.5 to 4.5 ppm/K. Patent Literature 2 discloses that a coefficient of linear expansion at 40 to 800° C. is preferably $2.0 \times 10^{-6}$/K to $4.6 \times 10^{-6}$/K.

PRIOR ART

Patent Literature

[Patent Literature 1] Japanese Patent Application Publication No. 2019-181457
[Patent Literature 2] Japanese Patent Application Publication No. 2014-189447

SUMMARY OF THE INVENTION

The thermal shock resistance of a honeycomb structure can be enhanced by setting the coefficient of linear expansion of the ceramics which are the constituent materials of the honeycomb structure, within the range taught in the prior art documents. However, even if a honeycomb structure made of ceramics having a coefficient of linear expansion within the range described in the prior art documents is housed in a metal pipe and installed on the way of the exhaust gas flow path of an automobile, and actually used, cracks were observed in some cases. When a crack occurs in the honeycomb structure, it becomes difficult for electricity to flow through the cracked portion, resulting in a decrease in heat generation performance and a decrease in mechanical strength. Therefore, it is desirable to further suppress the occurrence of cracks. Further, when the honeycomb structure vibrates during driving of the automobile, the honeycomb structure was sometimes displaced in the metal pipe.

The present invention was created in view of the above circumstances, and in one embodiment, an object of the present invention is to provide a honeycomb structure in which cracks are less likely to occur and positional displacement is less likely to occur when housed in a metal pipe and subjected to temperature changes and vibrations. In another embodiment, an object of the present invention is to provide an electrically heated carrier provided with such a honeycomb structure. In yet another embodiment, an object of the present invention is to provide an exhaust gas purification device provided with such an electrically heated carrier.

In one embodiment, the present invention provides a honeycomb structure, comprising:

an electrically conductive honeycomb structure portion, comprising an outer peripheral wall, and partition walls disposed inside the outer peripheral wall and partitioning a plurality of cells forming flow paths from one end surface to the other end surface; and a pair of electrode layers provided on an outer surface of the outer peripheral wall so as to face each other across a central axis of the honeycomb structure portion;

wherein a coefficient of linear expansion of the honeycomb structure portion measured according to JIS R1618:2002 when temperature is changed from 40° C. to 300° C. is $4.1 \times 10^{-6}$/° C. or more, and the coefficient of linear expansion of the honeycomb structure portion measured according to JIS R1618:2002 when the temperature is changed from 300° C. to 800° C. is $4.2 \times 10^{-6}$/° C. or more and $4.8 \times 10^{-6}$/° C. or less.

In another embodiment, the present invention provides an electrically heated carrier, comprising:

the honeycomb structure; and metal terminals bonded to an outer surface of each of the pair of electrode layers.

In yet another embodiment, the present invention provides an exhaust gas purification device, comprising:

the electrically heated carrier; and a tubular metal pipe accommodating the electrically heated carrier.

The honeycomb structure according to an embodiment of the present invention is less prone to cracks when accommodated in a metal pipe and subjected to temperature changes. Therefore, for example, by applying the honeycomb structure to an EHC, it is possible to provide an EHC that has an excellent thermal shock resistance that prevents cracking even when rapidly heated by high-temperature exhaust gas. Further, even if vibration occurs during high-temperature heating, the honeycomb structure accommodated in the metal pipe is less likely to be displaced.

DETAILED DESCRIPTION OF THE INVENTION

Hereinafter, embodiments of the present invention will now be described in detail with reference to the drawings. It should be understood that the present invention is not intended to be limited to the following embodiments, and any change, improvement or the like of the design may be appropriately added based on ordinary knowledge of those skilled in the art without departing from the spirit of the present invention.

1. Electrically Heated Carrier

Figure 1:
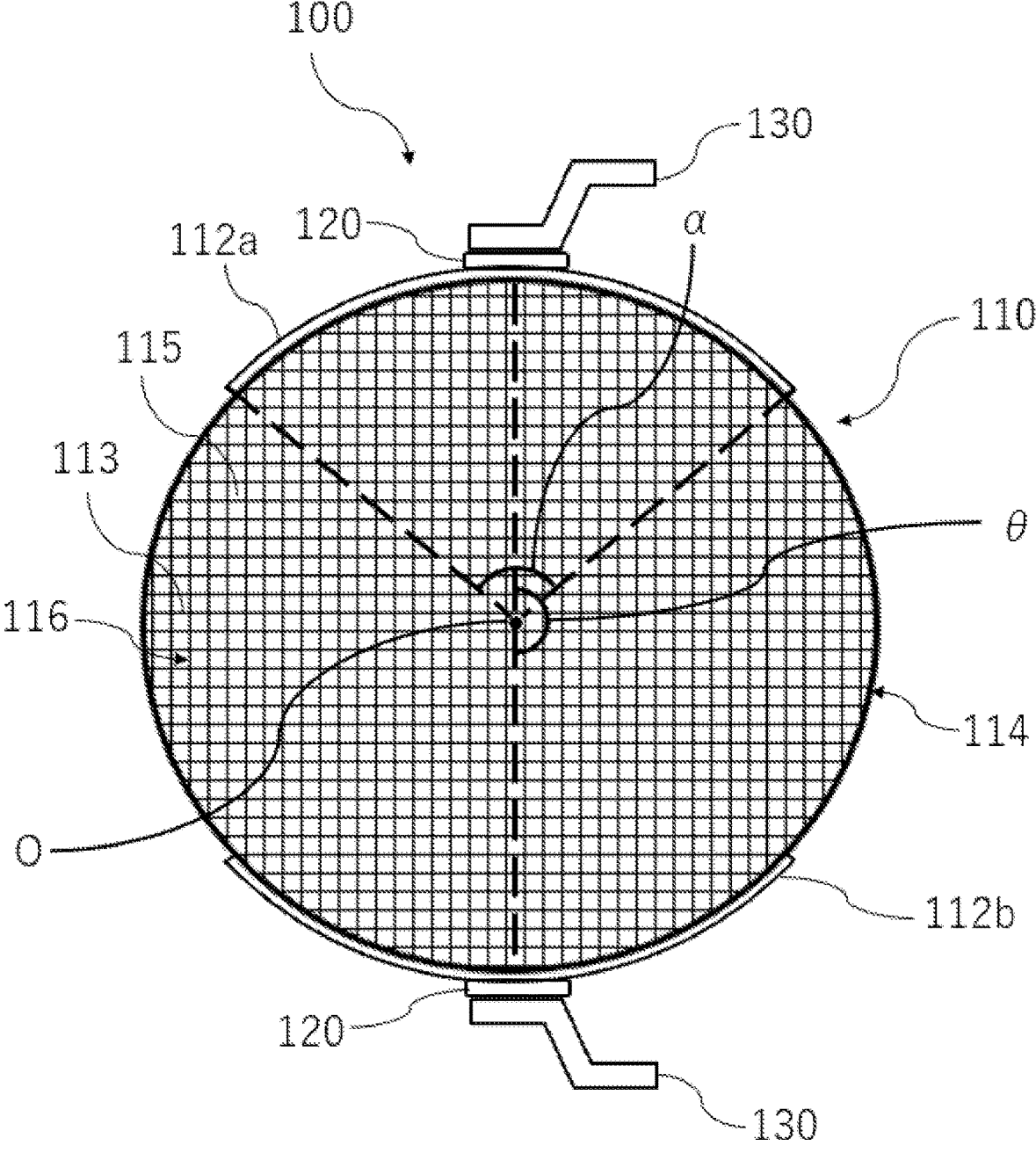
FIG. 1 is a schematic view of an electrically heated carrier according to one embodiment of the present invention when observed from one end surface.
Figure 2:
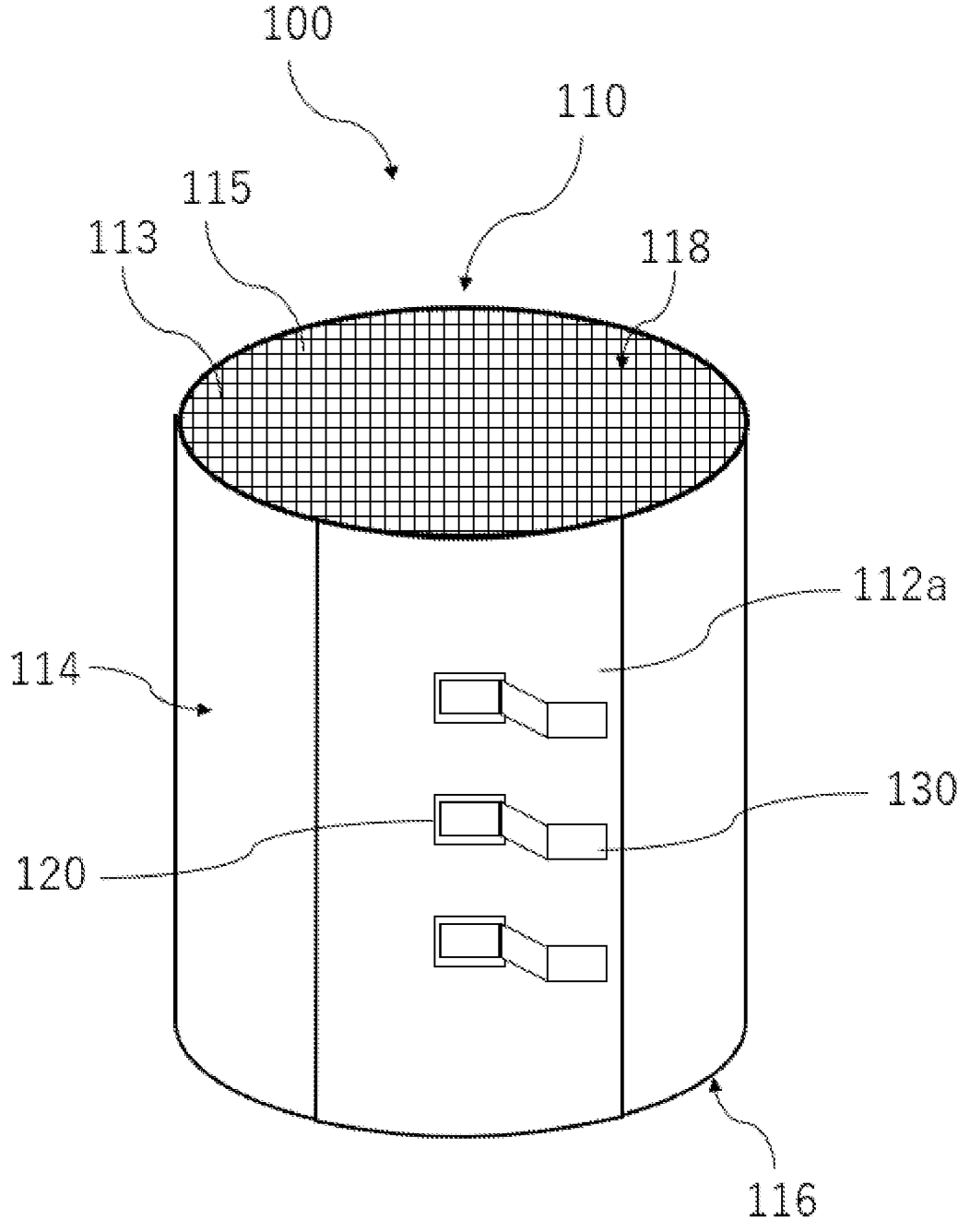
FIG. 2 is a schematic perspective view of an electrically heated carrier according to one embodiment of the present invention.

FIG. 1 is a schematic view of an electrically heated carrier 100 according to one embodiment of the present invention when observed from one end surface 116. FIG. 2 is a schematic perspective view of the electrically heated carrier 100 according to one embodiment of the present invention. The electrically heated carrier 100 comprises a honeycomb structure 110 and metal terminals 130. By carrying a catalyst on the electrically heated carrier 100, the electrically heated carrier 100 can be used as a catalyst carrier.

Examples of catalysts include precious metal catalysts and other catalysts. As a precious metal catalyst, examples include three-way catalysts and oxidation catalysts carrying precious metals such as platinum (Pt), palladium (Pd), and rhodium (Rh) on the surface of alumina pores, and containing co-catalysts such as ceria and zirconia, or lean $NO_x$ trap catalysts (LNT catalysts) containing an alkaline earth metal and platinum as nitrogen oxide ($NO_x$) storage components. Examples of catalysts that do not use precious metals include $NO_x$ selective reduction catalysts (SCR catalysts) containing copper-substituted or iron-substituted zeolites. Further, two or more catalysts selected from these catalysts may be used. The method for carrying the catalyst is also not particularly limited, and a known method for carrying the catalyst on the honeycomb structure can be employed.

1-1. Honeycomb Structure

In one embodiment, the honeycomb structure 110 comprises:
  a conductive honeycomb structure portion, comprising an outer peripheral wall 114; and partition walls 113 disposed inside the outer peripheral wall 114 and partitioning a plurality of cells 115 forming flow paths from one end surface 116 to the other end surface 118; and
  a pair of electrode layers 112a, 112b provided on an outer surface of the outer peripheral wall 114 so as to face each other across a central axis O of the honeycomb structure portion;
The outer shape of the honeycomb structure 110 is not particularly limited, and may be, for example, a pillar shape having round end surfaces such as circular, oval, elliptical, racetrack and elongated circle shapes, a pillar shape having polygonal shaped end surfaces such as a triangle or a quadrangle, and a pillar shape having other irregular shaped end surfaces. The illustrated honeycomb structure 110 has a circular end surface shape and a cylindrical shape as a whole.

The height of the honeycomb structure 110 (the length from one end surface to the other end surface) is not particularly limited, and may be appropriately set according to the applications and required performance. The relationship between the height of the honeycomb structure and the maximum diameter of each end surface (that is, the maximum length of the diameters passing through the center of gravity of each end surface of the honeycomb structure) is not particularly limited either. Therefore, the height of the honeycomb structure may be longer than the maximum diameter of each end surface, or the height of the honeycomb structure may be shorter than the maximum diameter of each end surface.

In addition, in order to improve the heat resistance (to suppress cracks occurring in the circumferential direction of the outer peripheral wall), the size of the honeycomb structure 110 is preferably such that the area of one end surface is 2,000 to 20,000 $mm^2$, and more preferably 5,000 to 15,000 $mm^2$.

The outer peripheral wall 114 and the partition walls 113 have higher volume resistivity than the electrode layers 112a and 112b, but are electrically conductive. The volume resistivity of the outer peripheral wall 114 and the partition walls 113 is not particularly limited as long as they can generate heat by Joule heat when energized, but it is preferably 0.1 to 200 Ω·cm, more preferably 1 to 200 Ω·cm, and even more preferably 10 to 100 Ω·cm, when measured at 25° C. by a four-terminal method.

The material of the outer peripheral wall 114 and the partition walls 113 is not particularly limited as long as it can generate heat by Joule heat when energized, and metal and ceramics (in particular, conductive ceramics) can be used in one type or in combination of two or more types. The material of the outer peripheral wall 114 and the partition walls 113 is not limited, but may comprise one or more selected from oxide ceramics such as alumina, mullite, zirconia and cordierite, and non-oxide ceramics such as silicon carbide, silicon nitride and aluminum nitride. In addition, a silicon carbide-silicon composite material, a silicon carbide-graphite composite material, or the like can also be used. Among these materials, from the viewpoint of achieving both heat resistance and conductivity, it is preferable that the outer peripheral wall 114 and the partition walls 113 be mainly composed of a silicon carbide-silicon composite material or silicon carbide. When it is said that the material of the outer peripheral wall 114 and the partition walls 113 is mainly composed of the silicon carbide-silicon composite material, it means that the outer peripheral wall 114 and the partition walls 113 comprise 90% by mass or more of the silicon carbide-silicon composite material (total mass), respectively. Here, the silicon carbide-silicon composite material contains silicon carbide particles as an aggregate and silicon as a binder for binding the silicon carbide particles, and it is preferable that multiple silicon carbide particles are joined by the silicon so as to form pores among the silicon carbide particles. When it is said that the material of the outer peripheral wall 114 and the partition walls 113 is mainly composed of silicon carbide, it means that the outer peripheral wall 114 and the partition walls 113 comprise 90% by mass or more of silicon carbide (total mass), respectively.

When the outer peripheral wall 114 and the partition walls 113 contain a silicon carbide-silicon composite material, a ratio of the "mass of silicon as a binder" contained in the outer peripheral wall 114 and the partition walls 113 to a total of the "mass of silicon carbide particles as an aggregate" contained in the outer peripheral wall 114 and the partition walls 113 and the "mass of silicon as a binder" contained in the outer peripheral wall 114 and the partition walls 113 is preferably 10 to 40% by mass, more preferably 15 to 35% by mass, respectively. When it is 10% by mass or more, the strength of the outer peripheral wall 114 and the partition walls 113 is sufficiently maintained. When it is 40% by mass or less, it becomes easier to retain the shape during firing.

When the electrically heated carrier 100 is used in an exhaust gas purification device, the electrically heated carrier 100 is often fixed by push canning in which it is pushed into a metal pipe provided on the way of an exhaust gas flow path for flowing exhaust gas from an engine. When a pressure is applied to the outer peripheral wall 114 of the honeycomb structure 110 from the metal pipe side, the electrically heated carrier 100 is stably fixed inside the metal pipe.

When high-temperature exhaust gas from the engine flows into the cells 115, the honeycomb structure 110 thermally expands. When the thermal expansion of the honeycomb structure 110 increases, tensile stress is generated in the outer peripheral wall 114, which may cause cracks. However, if the thermal expansion of the honeycomb structure 110 is suppressed by the pressure from the metal pipe, cracks are less likely to occur on the honeycomb structure 110. However, the metal pipe also thermally expands under high temperatures. For this reason, thermal expansion of the honeycomb structure 110 to some extent can suppress decrease of pressure from the metal pipe, which is effective in suppressing cracks.

The present inventors studied the relationship between the thermal expansion of the honeycomb structure 110 and crack suppression from the above point of view, and have found that it is advantageous to increase the thermal expansion in the low temperature range from 40° C. to 300° C. and keep the thermal expansion from 300° C. to 800° C. at the same level as the conventional technology.

Specifically, for the honeycomb structure portion, it is effective in suppressing cracks if the coefficient of linear expansion measured according to JIS R1618:2002 when temperature is changed from 40° C. to 300° C. is $4.1 \times 10^{-6}$/° C. or more, and the coefficient of linear expansion measured according to JIS R1618:2002 when the temperature is changed from 300° C. to 800° C. is $4.2 \times 10^{-6}$/° C. or more and $4.8 \times 10^{-6}$/° C. or less.

If the coefficient of linear expansion of the honeycomb structure portion measured according to JIS R1618:2002 when temperature is changed from 40° C. to 300° C. is $4.1 \times 10^{-6}$/° C. or more, the widening of difference in the thermal expansion from the metal tube at high temperatures can be suppressed, which contributes to suppressing the decrease of pressure from the metal pipe. The lower limit of the coefficient of linear expansion of the honeycomb structure portion when the temperature is changed from 40° C. to 300° C. is preferably $4.5 \times 10^{-6}$/° C. or more, and more preferably $5.0 \times 10^{-6}$/° C. or more.

However, a heat treatment for baking the catalyst on the honeycomb structure 110 is usually performed before canning. Therefore, the advantage of suppressing cracks by suppressing the decrease of pressure from the metal pipe cannot be obtained during the heat treatment for baking the catalyst. Therefore, it is desirable to avoid excessive thermal expansion of the honeycomb structure 110. Therefore, the upper limit of the coefficient of linear expansion of the honeycomb structure portion when the temperature is changed from 40° C. to 300° C. is preferably $7.5 \times 10^{-6}$/° C. or less, and more preferably $6.0 \times 10^{-6}$/° C. or less.

If the coefficient of linear expansion measured according to JIS R1618:2002 when the temperature is changed from 300° C. to 800° C. is $4.2 \times 10^{-6}$/° C. or more, the widening of difference in the thermal expansion from the metal pipe at high temperatures can be suppressed, which contributes to suppressing the decrease of pressure from the metal pipe. The lower limit of the coefficient of linear expansion of the honeycomb structure portion when the temperature is changed from 300° C. to 800° C. is preferably $4.3 \times 10^{-6}$/° C. or more, and more preferably $4.4 \times 10^{-6}$/° C. or more.

Further, If the coefficient of linear expansion measured according to JIS R1618:2002 when the temperature is changed from 300° C. to 800° C. is $4.8 \times 10^{-6}$/° C. or less, it is possible to prevent the thermal stress generated inside the honeycomb structure from becoming excessively large at high temperatures. The upper limit of the coefficient of linear expansion of the honeycomb structure body when the temperature is changed from 300° C. to 800° C. is preferably $4.7 \times 10^{-6}$/° C. or less, and more preferably $4.6 \times 10^{-6}$/° C. or less.

In a preferred embodiment, the coefficient of linear expansion of the honeycomb structure measured according to JIS R1618:2002 when the temperature is changed from 40° C. to 300° C. is larger than the coefficient of linear expansion of the honeycomb structure measured according to JIS R1618:2002 when the temperature is changed from 300° C. to 800° C. Specifically, assuming $CTE_A$ is the coefficient of linear expansion of the honeycomb structure portion measured according to JIS R1618:2002 when the temperature is changed from 40° C. to 300° C., and $CTE_B$ is the coefficient of linear expansion of the honeycomb structure portion measured according to JIS R1618:2002 when the temperature is changed from 300° C. to 800° C., $CTE_A > CTE_B$ is satisfied.

It is preferable that $CTE_A/CTE_B \geq 1.1$ be satisfied, and more preferable that $CTE_A/CTE_B \geq 1.2$ be satisfied.

Although the upper limit of $CTE_A/CTE_B$ is not particularly set, typically $1.5 \geq CTE_A/CTE_B \geq 1.1$ is satisfied. More typically, $1.4 \geq CTE_A/CTE_B \geq 1.2$ is satisfied.

The coefficient of linear expansion of the honeycomb structure portion is measured by the following procedure. A prismatic sample having a dimension of 3 mm×3 mm×20 mm (length in the extending direction of the cells) is cut from the central portion in the radial direction and the height direction of the honeycomb structure portion. The coefficient of linear expansion of the sample is measured under the temperature change conditions described above, and the measured value is obtained.

A method of generating a change between the coefficient of linear expansion when the temperature is changed from 40° C. to 300° C. and the coefficient of linear expansion when the temperature is changed from 300° C. to 800° C. in the honeycomb structure portion includes, but not limited to, a method of using a material that undergoes a phase transition between 40° C. and 300° C. and expands significantly in the honeycomb structure portion (outer peripheral wall, partition walls).

Cristobalite is an example of a material that undergoes a phase transition between 40° C. to 300° C. and expands significantly. Cristobalite undergoes a phase transition at around 200 to 300° C., and expands significantly. Therefore, when the content of cristobalite is large, the coefficient of linear expansion can be increased when the temperature is changed from 40° C. to 300° C. Cristobalite may be added to the ceramic raw material for forming the outer peripheral wall 114 and the partition walls 113, but when the ceramic raw material for forming the outer peripheral wall 114 and the partition walls 113 contains Si, an oxide film containing cristobalite is generated by firing at a high temperature in an oxidizing atmosphere. Therefore, the content of cristobalite can also be controlled by adjusting the oxidation treatment conditions after firing (temperature, holding time, type of oxidizing atmosphere, heating rate, cooling rate, and the like). Accordingly, in one embodiment, at least part of the surface of the outer peripheral wall and at least part of the surface of the partition walls are coated with an oxide film containing cristobalite.

The shape of the cells in the cross-section perpendicular to the direction in which the cells extend 115 is not limited, but is preferably quadrangular, hexagonal, octagonal, or a combination thereof. Among these, quadrangles and hexagons are preferred. Such a cell shape reduces the pressure loss when exhaust gas is caused to flow through the honeycomb structure 110, resulting in excellent purification performance of the catalyst. A hexagonal shape is particularly preferable from the viewpoint that it is easy to achieve both structural strength and heat generation uniformity.

The cells 115 may extend from one end surface 116 to the other end surface 118. In that case, the cells 115 may have the first cells sealed on one end surface 116 and having openings on the other end surface 118, and the second cells having openings on one end surface 116 and sealed on the other end surface 118, which are alternately arranged adjacent to each other with the partition walls 113 interposed therebetween.

The thickness of the partition walls 113 that partition the cells 115 is preferably 0.1 to 0.3 mm, more preferably 0.15 to 0.25 mm. When the partition walls 113 has a thickness of 0.1 mm or more, it is possible to suppress the decrease in the strength of the honeycomb structure 110. When the partition walls 113 has a thickness of 0.3 mm or less, if the honeycomb structure 110 is used as a catalyst carrier to carry a catalyst, it is possible to suppress an increase in pressure loss when an exhaust gas flows. In the present invention, the thickness of the partition wall 113 is defined as a crossing length of a line segment that cross the partition wall 133 when the centers of gravity of adjacent cells 115 are connected by this line segment in a cross-section perpendicular to the direction in which the cells 115 extend.

The honeycomb structure 110 preferably has a cell density of 40 to 150 cells/cm$^2$, more preferably 70 to 100 cells/cm$^2$, in a cross-section perpendicular to the direction in which the cells 115 extend. By setting the cell density within such a range, the purification performance of catalyst can be enhanced while reducing the pressure loss when exhaust gas is caused to flow through the honeycomb structure 110. When the cell density is 40 cells/cm$^2$ or more, a sufficient catalyst carrying area can be ensured. When the cell density is 150 cells/cm$^2$ or less, if the honeycomb structure 110 is used as a catalyst carrier to carry a catalyst, the pressure loss when exhaust gas flows is suppressed from becoming excessively large. The cell density is a value obtained by dividing the number of cells by the area of one end surface of the honeycomb structure excluding the outer peripheral wall portion.

The partition wall 113 may be dense, but is preferably porous. The porosity of the partition walls 113 is preferably 35 to 60%, more preferably 35 to 45%. When the porosity is 35% or more, it becomes easier to suppress deformation during firing. When the porosity is 60% or less, the strength of the honeycomb structure 110 is sufficiently maintained. Porosity is a value measured by a mercury porosimeter. The term "dense" means that the porosity is 5% or less.

The average pore size of the partition walls 113 is preferably 2 to 15 μm, more preferably 4 to 8 μm. When the average pore diameter is 2 μm or more, excessive increase in volume resistivity can be suppressed. When the average pore diameter is 15 μm or less, the volume resistivity is prevented from becoming too small. The average pore diameter is a value measured with a mercury porosimeter.

Providing the honeycomb structure 110 with an outer peripheral wall 114 is useful from the viewpoint of ensuring the structural strength of the honeycomb structure 110 and suppressing leakage of the fluid flowing through the cells 115 from the outer peripheral side surface. In this regard, the thickness of the outer peripheral wall 114 is preferably 0.1 mm or more, more preferably 0.15 mm or more, and even more preferably 0.2 mm or more. However, if the outer peripheral wall 114 is too thick, the strength becomes too high, and the strength balance with the partition walls 113 is lost, resulting in a decrease in thermal shock resistance. Therefore, the thickness of the outer peripheral wall 114 is preferably 1.0 mm or less, more preferably 0.7 mm or less, and even more preferably 0.5 mm or less. Here, the thickness of the outer peripheral wall 114 is measured by observing the location of the outer peripheral wall 114 whose thickness is to be measured in the cross-section perpendicular to the direction in which the cells 115 extend, and defined as the thickness in the direction normal to the tangential line of the outer surface of the outer peripheral wall 114 at the measurement location.

On the outer peripheral wall 114, by arranging electrode layers 112a and 112b having a volume resistivity lower than that of the outer peripheral wall 114, the current spreads easily in the circumferential direction of the honeycomb structure 110 and in the direction in which the cells 115 extend, which enables to improve the heat generation uniformity of the honeycomb structure 110. In the cross-section perpendicular to the cells 115, an angle $\theta(0°{\leq}\theta{\leq}180°)$ formed by two line segments extending from the center of each of the pair of electrode layers 112a and 112b in the circumferential direction to the central axis O of the honeycomb structure 110 is preferably $150°{\leq}\theta{\leq}180°$, more preferably $160°{\leq}\theta{\leq}180°$, even more preferably $170°{\leq}\theta{\leq}180°$, and 180° is most preferred.

Although there are no particular restrictions on the areas where the electrode layers 112a and 112b are formed, from the viewpoint of improving the heat generation uniformity of the honeycomb structure 110, it is preferable that the electrode layers 112a and 112b extend on the outer surface of the outer peripheral wall 114 in a strip shape, in the circumferential direction of the honeycomb structure 110 and in the direction in which the cells 115 extend. Specifically, in the cross-section perpendicular to the direction in which the cells 115 extend, a central angle α formed by two line segments connecting both side ends of the electrode layers 112a and 112b in the circumferential direction with the central axis O is preferably 30° or more, more preferably 40° or more, and even more preferably 60° or more, from the viewpoint of spreading the current in the circumferential direction to improve heat generation uniformity. However, if the central angle α is too large, less current passes through the interior of the honeycomb structure 110 and more current passes near the outer peripheral wall 114. Therefore, from the viewpoint of heat generation uniformity of the honeycomb structure 110, the central angle α is preferably 140° or less, more preferably 130° or less, and even more preferably 120° or less. In addition, it is desirable that the each of the electrode layers 112a and 112b extend over 80% or more, preferably over 90% or more, and more preferably over the entire length of the length between both end surfaces of the honeycomb structure 110. The electrode layers 112*a* and 112*b* may be composed of a single layer, or may have a laminated structure in which multiple layers are laminated.

The thickness of the electrode layers 112*a* and 112*b* is preferably 0.01 to 5 mm, more preferably 0.01 to 3 mm. Heat generation uniformity can be increased by setting it to such a range. When the thickness of the electrode layers 112*a* and 112*b* is 0.01 mm or more, the electrical resistance is appropriately controlled, and heat can be generated more uniformly. When the thickness of the electrode layers 112*a* and 112*b* is 5 mm or less, the risk of breakage during canning is reduced. The thickness of the electrode layers 112*a* and 112*b* is measured by observing the location of the electrode layers 112*a* and 112*b* whose thickness is to be measured in the cross-section perpendicular to the direction in which the cells 115 extend, and defined as the thickness in the direction normal to the tangential line of the outer surface of the electrode layers 112*a* and 112*b* at the measurement location.

By making the volume resistivity of the electrode layers 112*a* and 112*b* lower than the volume resistivity of the partition walls 113 and the outer peripheral wall 114, electricity tends to flow preferentially through the electrode layers 112*a* and 112*b*, and electricity tends to spread in the circumferential direction of the honeycomb structure 110 and in the direction in which the cells 115 extend when energized. The volume resistivity of the electrode layers 112*a* and 112*b* is preferably 1/10 or less, more preferably 1/20 or less, and even more preferably 1/30 or less of the volume resistivity of the partition walls 113 and the outer peripheral wall 114. However, if the difference in volume resistivity between them becomes too large, the current concentrates between the ends of the opposing electrode layers 112*a* and 112*b*, and the heat generation of the honeycomb structure 110 is biased. Therefore, the volume resistivity of the electrode layers 112*a* and 112*b* is preferably 1/200 or more, more preferably 1/150 or more, and even more preferably 1/100 or more of the volume resistivity of the partition walls 113 and the outer peripheral wall 114. In the present invention, the volume resistivity of the electrode layer, the partition wall and the outer peripheral wall is the value measured at 25° C. by a four-terminal method.

The material of the electrode layers 112*a* and 112*b* is not limited, but a composite material (cermet) of metal and ceramics (especially conductive ceramics) can be used. Examples of metals include single metals such as Cr, Fe, Co, Ni, Si, and Ti, and alloys containing at least one metal selected from these metals. Examples of ceramics include, but are not limited to, silicon carbide (SiC), as well as metal compounds such as metal silicides such as tantalum silicide (TaSi$_2$) and chromium silicide (CrSi$_2$). Specific examples of composite materials (cermets) of metal and ceramics include composite materials of metallic silicon and silicon carbide; composite materials of metal silicide (such as tantalum silicide and chromium silicide), metallic silicon and silicon carbide; and furthermore, from the viewpoint of reducing thermal expansion, composite materials in which one or more kinds of insulating ceramics such as alumina, mullite, zirconia, cordierite, silicon nitride and aluminum nitride are added to one or more of the above metals can be mentioned. As the material of the electrode layers 112*a* and 112*b*, among the various metals and ceramics described above, a composite material of metal silicide (such as tantalum silicide or chromium silicide), metallic silicon and silicon carbide, for which the partition walls and the outer peripheral wall can be fired at the same time, is preferable for the reason that it can contribute to simplification of the manufacturing process.

1-2. Metal Terminal

A metal terminal 130 is directly or indirectly joined to the respective outer surfaces of the pair of electrode layers 112*a* and 112*b*. When a voltage is applied to the honeycomb structure 110 through the metal terminals 130, heat can be generated in the honeycomb structure 110 by Joule heat. Therefore, the honeycomb structure 110 can also be suitably used as a heater. This makes it possible to improve heat generation uniformity of the honeycomb structure 110. The applied voltage is preferably 12 to 900 V, more preferably 48 to 600 V, but the applied voltage can be changed as appropriate.

Although the metal terminals 130 and the electrode layers 112*a* and 112*b* may be directly joined, for the purpose of alleviating the difference in thermal expansion between the electrode layers 112*a* and 112*b* and the metal terminals 130 and of improving the joining reliability of the metal terminals 130, they may be joined through one or two or more underlying layers 120. Therefore, in a preferred embodiment, the honeycomb structure 110 has a pair of electrode layers 112*a* and 112*b* arranged on the outer peripheral wall 114 so as to face each other with the central axis of the honeycomb structure 110 interposed therebetween, and one or more metal terminals 130 are joined to each of the electrode layers 112*a* and 112*b* via the underlying layer 120.

From the viewpoint of improving the joining reliability, it is preferable to decrease the coefficient of thermal expansion stepwise in the order of metal terminal 130→(underlying layer 120)→electrode layers 112*a* and 112*b*→outer peripheral wall 114. In addition, the "coefficient of thermal expansion" here means the coefficient of linear expansion measured according to JIS R1618:2002 when changing from 25° C. to 1000° C.

The material of the metal terminal 130 is not particularly limited as long as it is metal, and a single metal, an alloy, or the like can be used. However, from the viewpoint of corrosion resistance, volume resistivity and coefficient of linear expansion, for example, an alloy containing at least one selected from the group consisting of Cr, Fe, Co, Ni and Ti is preferred, and stainless steel and Fe—Ni alloys are more preferred. The shape and size of the metal terminal 130 are not particularly limited, and can be appropriately designed according to the size, the current-carrying performance, and the like of the honeycomb structure 110.

The material of the underlying layer 120 is not limited, but a composite material (cermet) of metal and ceramics (especially conductive ceramics) can be used. The coefficient of thermal expansion of the underlying layer 120 can be controlled by adjusting the compounding ratio of metal and ceramics, for example.

The underlayer 120 preferably contains one or more metals selected from Ni-based alloys, Fe-based alloys, Ti-based alloys, Co-based alloys, metallic silicon, and Cr, although not limited thereto.

The underlayer 120 preferably contains one or more ceramics selected from oxide ceramics such as alumina, mullite, zirconia, glass and cordierite, and non-oxide ceramics such as silicon carbide, silicon nitride and aluminum nitride, although not limited thereto.

Although the thickness of the underlayer 120 is not particularly limited, it is preferably 0.1 to 1.5 mm, more preferably 0.3 to 0.5 mm, from the viewpoint of suppressing cracks. The thickness of the underlying layer 120 is measured by observing the location of the underlying layer 120 whose thickness is to be measured in the cross-section perpendicular to the direction in which the cells extend, and defined as the thickness in the direction normal to the tangential line of the outer surface of the underlying layer 120 at the measurement location.

The method of joining the metal terminals 130 with the electrode layers 112a, 112b or with the underlying layer 120 is not particularly limited, but examples thereof include thermal spraying, welding and brazing.

2. Exhaust Gas Purification Device

Figure 3:
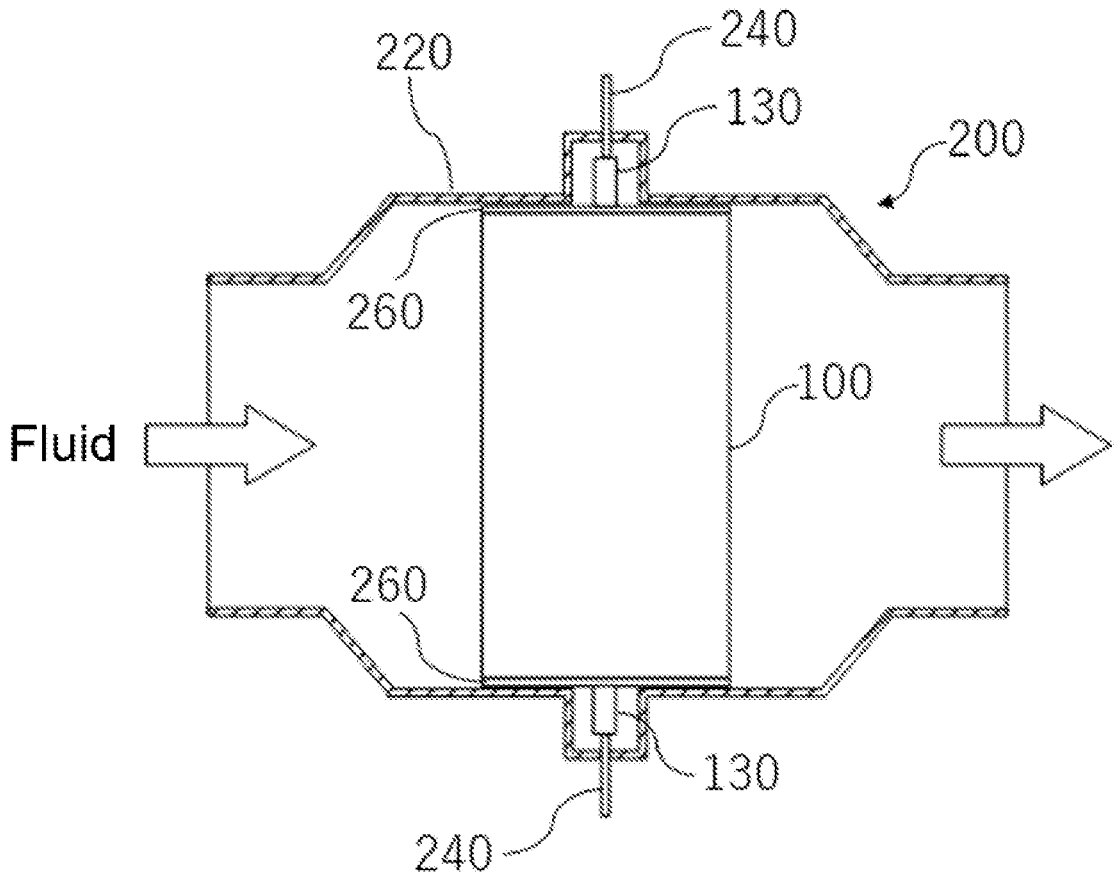
FIG. 3 is a schematic cross-sectional view showing an exhaust gas purification device according to one embodiment of the invention.

The electrically heated carrier according to an embodiment of the present invention can be used in an exhaust gas purification device. Referring to FIG. 3, the exhaust gas purification device 200 comprises an electrically heated carrier 100 and a tubular metal pipe 220 that accommodates the electrically heated carrier 100. An electrical wire 240 for power supply can be connected to the metal terminals 130 of the electrically heated carrier 100. The material of the metal pipe 220 is not limited, but includes stainless steel, for example.

In the exhaust gas purification device 200, the electrically heated carrier 100 can be installed on the way of the flow path of a fluid such as automobile exhaust gas. The electrically heated carrier 100 can be fixed in the metal pipe 220 by, for example, push-canning in which it is pushed into the metal pipe 220 and fitted so that the direction in which the cells extend and the direction in which the metal pipe 220 extend match. A mat (also referred to as "cushion material") 260 can be provided between the metal pipe 220 and the electrically heated carrier 100. The material of the mat 260 is not limited, but ceramic fibers such as alumina fibers and mullite fibers are preferable for the reasons of suppressing displacement of the electrically heated carrier and maintaining contact pressure between the metal pipe and the electrically heated carrier.

The lower limit of the pressure that the electrically heated carrier 100 fixed in the metal pipe receives from the metal pipe is preferably 0.1 MPa or more, and more preferably 0.2 MPa or more, at 25° C. for the reason of preventing displacement due to exhaust gas pressure.

The upper limit of the pressure that the electrically heated carrier 100 fixed in the metal pipe receives from the metal pipe is preferably 1.0 MPa or less, and more preferably 0.8 MPa or less at 25° C., for the reason of preventing breakage of the honeycomb structure.

The pressure that the electrically heated carrier 100 fixed in the metal pipe receives from the metal pipe can be measured by calculating the value of GBD (Gap Bulk Density) from the outer diameter of the honeycomb structure, the inner diameter of the metal pipe, and the surface specific gravity (g/m$^2$) of the mat, and by obtaining the pressure (surface pressure) corresponding to the calculated value of GBD using a characteristic diagram (GBD-surface pressure curve) unique to each mat. GBD (Gap Bulk Density) [g/cm$^3$] refers to the filling density of the mat between the honeycomb structure and the metal pipe=surface specific gravity [g/m$^2$]/((inner diameter of metal pipe−outer diameter of honeycomb structure) [mm]×1000).

3. Manufacturing Method

Next, a method for manufacturing an electrically heated carrier according to one embodiment of the present invention will be exemplified. The electrically heated carrier can be manufactured by a manufacturing method comprising a step 1 of obtaining a honeycomb formed body; a step 2 of obtaining an unfired honeycomb structure with electrode layer forming paste; a step 3 of obtaining a honeycomb structure by firing the unfired honeycomb structure with the electrode layer forming paste; and a step 4 of joining metal terminals to the electrode layers.

Step 1

Step 1 is a step of preparing a honeycomb formed body, which is a precursor of a honeycomb structure. The honeycomb formed body can be prepared according to a method for preparing a honeycomb formed body in a known method for manufacturing a honeycomb structure. For example, first, metallic silicon powder (metallic silicon), a binder, a surfactant, a pore-forming material, water, and the like are added to silicon carbide powder (silicon carbide) to prepare a forming raw material. It is preferable that the mass of the metallic silicon powder be 10 to 40% by mass with respect to the sum of the mass of the silicon carbide powder and the mass of the metallic silicon powder. The average particle size of silicon carbide particles in the silicon carbide powder is preferably 3 to 50 μm, more preferably 3 to 40 μm. The average particle size of the metallic silicon particles in the metallic silicon powder is preferably 2 to 35 μm. The average particle size of silicon carbide particles and metallic silicon particles refers to the volume-based arithmetic mean size when the frequency distribution of particle sizes is measured by a laser diffraction method. The silicon carbide particles are fine particles of silicon carbide that constitute the silicon carbide powder, and the metallic silicon particles are fine particles of metallic silicon that constitute the metallic silicon powder. It should be noted that this is the composition of a forming raw material when the material of the honeycomb structure is a silicon-silicon carbide composite material, and when the material of the honeycomb structure is silicon carbide, metallic silicon is not added.

As the binder, methylcellulose, hydroxypropylmethylcellulose, hydroxypropoxylcellulose, hydroxyethylcellulose, carboxymethylcellulose, polyvinyl alcohol and the like can be mentioned. Among these, it is preferable to use methyl cellulose and hydroxypropoxyl cellulose in combination. The amount of the binder is preferably 2.0 to 10.0 parts by mass provided that the total mass of the silicon carbide powder and the metallic silicon powder is 100 parts by mass.

As the surfactant, ethylene glycol, dextrin, fatty acid soap, polyalcohol, and the like can be used. One type of them can be used alone, and two or more types can be used in combination. The amount of the surfactant is preferably 0.1 to 2.0 parts by mass provided that the total mass of the silicon carbide powder and the metallic silicon powder is 100 parts by mass.

The pore-forming material is not particularly limited as long as it forms pores after firing, and examples thereof include graphite, starch, foamed resin, water absorbent resin, silica gel, and the like. The amount of the pore-forming material is preferably 0.5 to 10.0 parts by mass provided that the total mass of the silicon carbide powder and the metallic silicon powder is 100 parts by mass. The average particle size of the pore-forming material is preferably 10 to 30 μm. The average particle size of the pore-forming material refers to the volume-based arithmetic mean size when the frequency distribution of particle sizes is measured by a laser diffraction method. When the pore-forming material is a water absorbent resin, the average particle size of the pore-forming material means the average particle size after water absorption.

The content of water is preferably 20 to 60 parts by mass provided that the total mass of the silicon carbide powder and the metallic silicon powder is 100 parts by mass.

Next, after kneading the obtained forming raw material and forming a green body, the green body is extrusion molded to prepare a pillar-shaped honeycomb formed body having an outer peripheral wall and partition walls. For extrusion molding, a die having a desired overall shape, cell shape, partition wall thickness, cell density, and the like can be used. Next, it is preferable to dry the obtained honeycomb formed body. When the length of the honeycomb formed body in the central axis direction is not the desired length, both ends of the honeycomb formed body can be cut to obtain the desired length. The dried honeycomb formed body is called a honeycomb dried body.

As a modification of step 1, the honeycomb formed body may be once fired. That is, in this modification, a honeycomb formed body is fired to prepare a honeycomb fired body, and step 2 is performed on the honeycomb fired body.

Step 2

Step 2 is a step of applying an electrode layer forming paste to the side surface of the honeycomb formed body to obtain an unfired honeycomb structure with the electrode layer forming paste. The electrode layer forming paste can be prepared by appropriately adding various additives to raw material powders (metal powder, ceramic powder, and the like) that have been compounded according to the required properties of the electrode layer, and kneading the mixture. Although the average particle size of the raw material powder is not limited, it is preferably, for example, 5 to 50 μm, more preferably 10 to 30 μm. The average particle size of the raw material powder refers to the volume-based arithmetic mean size when the frequency distribution of particle sizes is measured by a laser diffraction method.

Next, the electrode layer forming paste thus obtained is applied to desired portions of the side surface of the formed honeycomb body (typically a honeycomb dried body) to obtain an unfired honeycomb structure with the electrode layer forming paste. The method of preparing the electrode layer forming paste and the method of applying the electrode layer forming paste to the honeycomb formed body can be carried out according to a known method for manufacturing a honeycomb structure. However, in order to make the volume resistivity of the electrode layers lower than that of the outer peripheral wall and the partition walls, the metal content ratio can be made higher than that of the outer peripheral wall and the partition walls, or the particle size of the metal particles in the raw material powder can be reduced.

Step 3

Step 3 is a step of firing the unfired honeycomb structure with the electrode layer forming paste to obtain a honeycomb structure. Before firing, the unfired honeycomb structure with the electrode layer forming paste may be dried. Moreover, before firing, degreasing may be performed to remove the binder and the like. The method of degreasing and firing is not particularly limited, and firing can be performed using an electric furnace, a gas furnace, or the like. As the firing conditions, although they depend on the material of the honeycomb structure, it is preferable to heat at 1400 to 1500° C. for 1 to 20 hours in an inert atmosphere such as nitrogen or argon. Furthermore, after firing, it is preferable to perform oxidation treatment at a temperature ranging from 800° C. to the maximum oxidation treatment temperature for 1 to 20 hours in order to improve durability and form an oxide film containing cristobalite. It is preferable that the average heating rate from 800° C. to the maximum oxidation treatment temperature be 20 to 400° C./h, and the average cooling rate from the maximum oxidation treatment temperature to 800° C. is 400 to 40° C./h. The oxidation treatment can be performed, for example, in an oxygen atmosphere, an air atmosphere, or a water vapor atmosphere. When metallic silicon is used as the forming raw material, the amount of generated cristobalite can be adjusted by changing the oxidation treatment conditions. Specifically, slower heating rate and slower cooling rate at 800° C. or above increase the amount of generated cristobalite. Higher the temperature during the oxidation treatment and longer oxidation treatment time increases the amount of generated cristobalite. In addition, it is more advantageous to perform the oxidation treatment in the oxygen atmosphere or the water vapor atmosphere than in the air atmosphere to increase the amount of generated cristobalite. When the amount of generated cristobalite increases, the coefficient of linear expansion of the honeycomb structure tends to increase when the temperature is changed from 40° C. to 300° C.

Step 4

Step 4 is a step of joining metal terminals to the electrode layers. The joining method is not particularly limited, but examples thereof include thermal spraying, welding and brazing. From the viewpoint of improving the joining reliability between the electrode layer and the metal terminal, the underlying layer may be formed by a method such as thermal spraying.

EXAMPLES

The following examples are provided for a better understanding of the invention and its advantages, but are not intended to limit the scope of the invention.

Example 1

1. Preparation of Cylindrical Green Body

A ceramic raw material was prepared by mixing silicon carbide (SiC) powder and metallic silicon (Si) powder at a mass ratio of 80:20. Then, hydroxypropylmethyl cellulose as a binder, a water absorbent resin as a pore-forming material were added to the ceramic raw material, and water was added to obtain a forming raw material. Then, the forming raw material was kneaded by a vacuum kneader to prepare a cylindrical green body. The amount of the binder was 7 parts by mass provided that the total of silicon carbide (SiC) powder and metallic silicon (Si) powder was 100 parts by mass. The amount of the pore-forming material was 3 parts by mass provided that the total of silicon carbide (SiC) powder and metallic silicon (Si) powder was 100 parts by mass. The amount of water was 42 parts by mass provided that the total of silicon carbide (SiC) powder and metallic silicon (Si) powder was 100 parts by mass. The silicon carbide powder had an average particle size of 20 μm, and the metallic silicon powder had an average particle size of 6 μm. In addition, the average particle size of the pore-forming material was 20 μm. The average particle size of the silicon carbide powder, metallic silicon powder and pore-forming material refers to the volume-based arithmetic mean size when the frequency distribution of particle size is measured by a laser diffraction method.

2. Preparation of Honeycomb Dried Body

The obtained cylindrical green body was formed using an extruder having a grid-like die structure to obtain a cylindrical honeycomb formed body in which each cell had a hexagonal shape in a cross-section perpendicular to the direction in which the cells extend. This honeycomb formed body was dried by high-frequency dielectric heating, then dried at 120° C. for 2 hours using a hot gas dryer, and both end surfaces were cut by a predetermined amount to prepare a honeycomb dried body.

3. Preparation of Electrode Layer Forming Paste

Metallic silicon (Si) powder, silicon carbide (SiC) powder, methyl cellulose, glycerin, and water were mixed with a planetary centrifugal mixer to prepare an electrode layer forming paste. The Si powder and the SiC powder were blended in a volume ratio of Si powder:SiC powder=40:60. Further, provided that the total of Si powder and SiC powder was 100 parts by mass, methyl cellulose was 0.5 parts by mass, glycerin was 10 parts by mass, and water was 38 parts by mass. The average particle size of the metallic silicon powder was 6 μm. The silicon carbide powder had an average particle size of 35 μm. These average particle size refers to volume-based arithmetic mean size when the frequency distribution of particle size is measured by a laser diffraction method.

4. Application of Electrode Layer Forming Past

The above-mentioned electrode layer forming paste was applied by a curved surface printer on the outer surface of the outer peripheral wall of the above-mentioned honeycomb dried body at two locations so as to face each other across the central axis. Each application portion was formed in a strip shape over the entire length between both end surfaces of the honeycomb dried body (angle θ=180°, central angle α=90°).

5. Firing

After drying the honeycomb structure with the electrode layer forming paste at 120° C., it was degreased at 550° C. for 3 hours in an air atmosphere. Next, the degreased honeycomb structure with the electrode layer forming paste was fired and then oxidation treatment was performed to obtain a cylindrical honeycomb structure with a height of 65 mm and a diameter of 80 mm. The firing was performed in an argon atmosphere at 1450° C. for 2 hours. After that, oxidation treatment was performed under the conditions of an average heating rate from 800° C. to the maximum temperature, the maximum temperature of the oxidation treatment, the maximum temperature holding time, the average cooling rate from the maximum temperature to 800° C., and the oxidizing atmosphere listed in Table 1 to form an oxide film containing cristobalite. The generation of cristobalite was confirmed by analyzing partition wall samples with an X-ray diffractometer.

16

Example 2

A honeycomb structure was prepared under the same manufacture conditions as in Example 1, except that the oxidation treatment conditions were changed to those shown in Table 1.

Example 3

A honeycomb structure was prepared under the same manufacture conditions as in Example 1, except that a ceramic raw material for preparing a green body was prepared with increased mass ratio of metal silicon (Si) powder compared to Example 1, and the oxidation treatment conditions were changed to those shown in Table 1.

Example 4

A honeycomb structure was prepared under the same manufacture conditions as in Example 1, except that a ceramic raw material for preparing a green body was prepared with increased mass ratio of silicon carbide (SiC) powder compared to Example 1, and the oxidation treatment conditions were changed to those shown in Table 1.

Example 5

A honeycomb structure was prepared under the same manufacture conditions as in Example 1, except that the oxidation treatment conditions were changed to those shown in Table 1.

Example 6

A honeycomb structure was prepared under the same manufacture conditions as in Example 1, except that a ceramic raw material for preparing a green body was prepared with increased mass ratio of silicon carbide (SiC) powder compared to Example 1, and the oxidation treatment conditions were changed to those shown in Table 1.

Comparative Examples 1 to 3

A honeycomb structure was prepared under the same manufacture conditions as in Example 1, except that the oxidation treatment conditions were changed to those shown in Table 1.

Comparative Examples 4 to 5

A honeycomb structure was prepared under the same manufacture conditions as in Example 1, except that a ceramic raw material for preparing a green body was prepared with further added cordierite powder in addition to silicon carbide (SiC) powder and metal silicon (Si) powder, and the oxidation treatment conditions were changed to those shown in Table 1. Test examples in which cordierite powder was added to the ceramic raw material are indicated as "Yes" in the column "Cd contained" in Table 1. Test examples in which cordierite powder was not added to the ceramic raw material are indicated as "No" in the column "Cd contained" in Table 1.

Characteristic Evaluation

The honeycomb structures obtained under the above manufacturing conditions were evaluated for the following characteristics. In addition, a necessary number of honeycomb structures were prepared for the characteristic evaluation.

1. Coefficient of Linear Expansion

Each sample was taken from the center portion in the radial direction and in the height direction of the honeycomb structure portion of the honeycomb structure of the Examples and the Comparative Examples by the method described above, and the coefficient of linear expansion of the honeycomb structure portion measured according to JIS R1618:2002 when the temperature was changed from 40° C. to 300° C. (CTE$_A$ (40 to 300° C.)), and the coefficient of linear expansion of the honeycomb structure portion measured according to JIS R1618:2002 when the temperature was changed from 300° C. to 800° C. (CTE$_B$ (300 to 800° C.)) were measured. The results are shown in Table 1.

2. Catalyst Calcination Simulation Test

A simulation test was conducted to simulate the heating conditions during catalyst calcination. Specifically, the honeycomb structures according to the Examples and the Comparative Examples were held in an electric furnace at a furnace temperature of 550° C. for 20 minutes, removed from the furnace, naturally cooled for 15 minutes, and cooled to room temperature with a cooling fan. The presence or absence of cracks on the side surfaces and end surfaces of the honeycomb structure was visually inspected. This simulation test was performed on each of five honeycomb structures, and the number of honeycomb structures in which cracks were not found anywhere was counted. The results are shown in Table 1.

3. Thermal Test

The honeycomb structures according to the Examples and the Comparative Examples were subjected to a thermal test of honeycomb structure using a propane gas burner tester equipped with a metal pipe and a propane gas burner capable of supplying combustion gas into the metal pipe. Specifically, it was fixed in a metal pipe with an inner diameter of 87 mm by push-canning into the metal pipe made of stainless steel. At this time, a mat (cushion material) made of ceramics (alumina fibers, mullite fibers, and the like) was interposed between the metal pipe and the honeycomb structure. In addition, the surface pressure at 25° C. that the honeycomb structure fixed inside the metal pipe received from the metal pipe was calculated from the outer diameter of the honeycomb structure, the inner diameter of the metal pipe, and the surface specific gravity of the ceramic mat by the method described above and it was 0.1 MPa.

Next, a combustion gas generated by burning propane gas with the propane gas burner was caused to flow from one end surface of the honeycomb structure fixed in the metal pipe toward the other end surface to raise the combustion gas temperature on the inlet side of the honeycomb structure to 950° C. in 10 minutes, and the temperature was held for 5 minutes. Then, it was cooled to 150° C. in 3 minutes by flowing the air, and held at 150° C. for 10 minutes. Finally, it was allowed to cool to room temperature, and the honeycomb structure was taken out from the metal pipe. The presence or absence of cracks on the side surfaces and end surfaces of the taken-out honeycomb structure was visually inspected. This thermal test was performed on each of five honeycomb structures, and the number of honeycomb structures in which cracks were not found anywhere was counted. The results are shown in Table 1.

4. HVT Test

The honeycomb structures according to the Examples and the Comparative Examples were subjected to a thermal test of honeycomb structure using a propane gas burner tester equipped with a metal pipe and a propane gas burner capable of supplying combustion gas into the metal pipe. Specifically, it was fixed in a metal pipe with an inner diameter of 87 mm by push-canning into the metal pipe made of stainless steel. At this time, a mat (cushion material) made of ceramics (alumina fibers, mullite fibers, and the like) was interposed between the metal pipe and the honeycomb structure. In addition, the surface pressure at 25° C. that the honeycomb structure fixed inside the metal pipe received from the metal pipe was calculated from the outer diameter of the honeycomb structure, the inner diameter of the metal pipe, and the surface specific gravity of the ceramic mat by the method described above and it was 0.1 MPa.

Next, a combustion gas generated by burning propane gas with the propane gas burner was caused to flow from one end surface of the honeycomb structure fixed in the metal pipe toward the other end surface to raise the combustion gas temperature on the inlet side of the honeycomb structure to 900° C. in 10 minutes, and the temperature was held for 5 minutes. Then, it was cooled to 100° C. in 3 minutes by flowing the air, and held at 100° C. for 10 minutes. The series of operations described above was regarded as one cycle, and 96 cycles were performed. In addition, when the combustion gas was flowed, the honeycomb structure was simultaneously subjected to vibration with an acceleration of 40 G and a frequency of 150 Hz by a vibration load device. Finally, the honeycomb structure was allowed to cool to room temperature, and the displacement distance of the honeycomb structure inside the metal pipe in the length direction of the metal pipe between before and after the test was measured. The results are shown in Table 1.

TABLE 1

| | Oxidation treatment conditions | | | | | | Honeycomb structure portion CTE$_A$ (40 to 300° C.) ($\times 10^{-8}$/° C.) |
| | Average heating rate (° C./h) | Maximum temperature (° C.) | Holding time at maximum temperature (hr) | Average cooling rate (° C./h) | Oxidizing atmosphere | Cd contained | |
| --- | --- | --- | --- | --- | --- | --- | --- |
| Example 1 | 100 | 1250 | 5 | 150 | Air atmosphere | No | 4.88 |
| Example 2 | 100 | 1250 | 1.5 | 150 | Air atmosphere | No | 4.12 |
| Example 3 | 100 | 1250 | 5 | 150 | Water vapor | No | 5.98 |

TABLE 1-continued

| | | | | | | | |
|---|---|---|---|---|---|---|---|
| Example 4 | 100 | 1250 | 5 | 150 | Water vapor | No | 5.82 |
| Example 5 | 100 | 1250 | 10 | 150 | Water vapor | No | 6.80 |
| Example 6 | 100 | 1250 | 10 | 150 | Water vapor | No | 6.52 |
| Comparative Example 1 | 100 | 1050 | 5 | 150 | Air atmosphere | No | 3.57 |
| Comparative Example 2 | 100 | 1100 | 5 | 150 | Air atmosphere | No | 3.82 |
| Comparative Example 3 | 100 | 1300 | 1 | 150 | Air atmosphere | No | 4.02 |
| Comparative Example 4 | 100 | 1300 | 1 | 150 | Air atmosphere | Yes | 4.40 |
| Comparative Example 5 | 100 | 1250 | 5 | 150 | Water vapor | Yes | 5.92 |

| | | | Number of no cracks | | |
|---|---|---|---|---|---|
| | Honeycomb structure portion | | Catalyst | | |
| | $CTE_B$ (300 to 800° C.) ($\times 10^{-8}$/° C.) | $CTE_A$/ $CTE_B$ | calcination simulation test | Thermal test | HVT test |
| Example 1 | 4.57 | 1.07 | 5/5 | 5/5 | No displacement |
| Example 2 | 4.23 | 0.97 | 5/5 | 5/5 | No displacement |
| Example 3 | 4.35 | 1.37 | 5/5 | 5/5 | No displacement |
| Example 4 | 4.72 | 1.23 | 5/5 | 5/5 | No displacement |
| Example 5 | 4.33 | 1.57 | 3/5 | 5/5 | No displacement |
| Example 6 | 4.74 | 1.38 | 4/5 | 5/5 | No displacement |
| Comparative Example 1 | 4.51 | 0.79 | 5/5 | 2/5 | No displacement |
| Comparative Example 2 | 4.29 | 0.89 | 5/5 | 3/5 | No displacement |
| Comparative Example 3 | 4.85 | 0.83 | 5/5 | 4/5 | No displacement |
| Comparative Example 4 | 3.03 | 1.45 | 5/5 | 5/5 | 3.1 mm displacement |
| Comparative Example 5 | 3.02 | 1.96 | 5/5 | 5/5 | 2.3 mm displacment |

5. Discussion

From Table 1, it can be understood that in the honeycomb structures of Examples 1 to 6, in which $CTE_A$ (40 to 300° C.) and $CTE_B$ (300 to 800° C.) were optimized, cracks were less likely to occur when it was housed in a metal pipe and subjected to temperature changes. It can also be understood that in the honeycomb structures of Examples 1 to 4, in which $CTE_A$ (40 to 300° C.) and $CTE_B$ (300 to 800° C.) were further optimized, cracks were less likely to occur even when subjected to temperature changes at relatively low-temperature such as during catalyst calcination.

DESCRIPTION OF REFERENCE NUMERALS

110: Electrically heated carrier
110: Honeycomb structure
112a: Electrode layer
112b: Electrode layer
113: Partition wall
114: Outer peripheral wall
115: Cell
116: End surface
118: End surface
120: Underlying layer
130: Metal terminal
200: Exhaust gas purification device
220: Metal pipe
240: Electric wire
260: Mat

The invention claimed is:

1. A honeycomb structure, comprising:
an electrically conductive honeycomb structure portion, comprising an outer peripheral wall, and partition walls disposed inside the outer peripheral wall and partitioning a plurality of cells forming flow paths from one end surface to the other end surface; and
a pair of electrode layers provided on an outer surface of the outer peripheral wall so as to face each other across a central axis of the honeycomb structure portion;
wherein a coefficient of linear expansion of the honeycomb structure portion measured according to JIS R1618:2002 when temperature is changed from 40° C. to 300° C. is $4.1 \times 10^{-6}$/° C. or more, and the coefficient of linear expansion of the honeycomb structure portion measured according to JIS R1618:2002 when the temperature is changed from 300° C. to 800° C. is $4.2 \times 10^{-6}$/° C. or more and $4.8 \times 10^{-6}$/° C. or less.

2. The honeycomb structure according to claim 1, wherein the coefficient of linear expansion of the honeycomb structure measured according to JIS R1618:2002 when the temperature is changed from 40° C. to 300° C. is $4.1 \times 10^{-6}/°$ C. or more and $6.0 \times 10^{-6}/°$ C. or less.

3. The honeycomb structure according to claim 1, wherein a material of the outer peripheral wall and the partition walls is mainly composed of a silicon carbide-silicon composite material.

4. The honeycomb structure according to claim 3, wherein at least part of a surface of the outer peripheral wall and at least part of a surface of the partition walls are coated with an oxide film comprising cristobalite.

5. The honeycomb structure according to claim 1, wherein the coefficient of linear expansion of the honeycomb structure measured according to JIS R1618:2002 when the temperature is changed from 40° C. to 300° C. is larger than the coefficient of linear expansion of the honeycomb structure measured according to JIS R1618:2002 when the temperature is changed from 300° C. to 800° C.

6. An electrically heated carrier, comprising:

the honeycomb structure according to claim 1; and metal terminals bonded to an outer surface of each of the pair of electrode layers.

7. An exhaust gas purification device, comprising:

the electrically heated carrier according to claim 6; and a tubular metal pipe accommodating the electrically heated carrier.

\* \* \* \* \*